July 14, 1953 R. POUIT 2,645,435
STRUCTURE FOR CONVEYING A FLUID AT HIGH-TEMPERATURE
Filed July 26, 1949
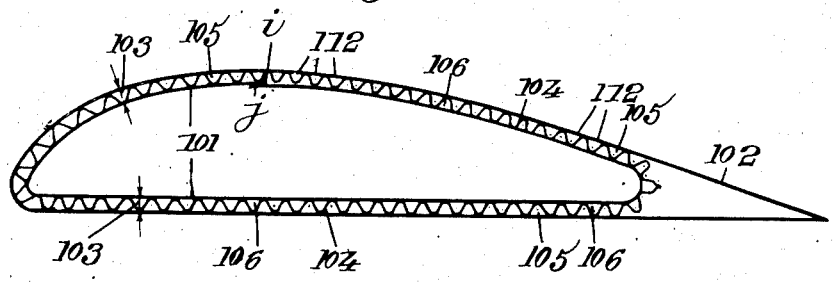
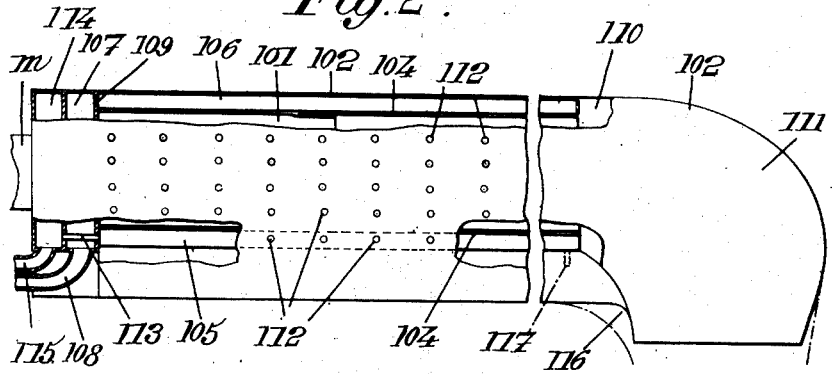
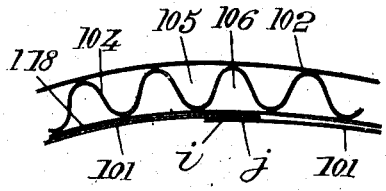
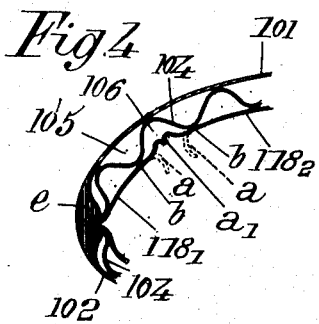
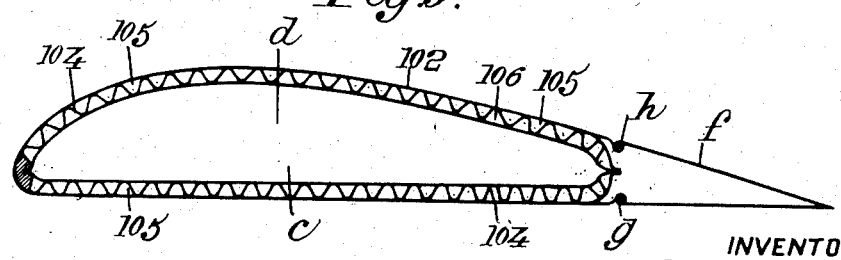
INVENTOR.
ROBERT POUIT
BY Mock & Blum
ATTORNEYS Patented July 14, 1953

2,645,435

UNITED STATES PATENT OFFICE 2,645,435

STRUCTURE FOR CONVEYING A FLUID AT HIGH TEMPERATURE

Robert Pouit, Lyon, France, assignor to Societe Industrielle Generale de Mecanique Appliquee (S. I. G. M. A.), Villeurbanne, France, a society of France Original application April 9, 1947, Serial No. 740,327. Divided and this application July 26, 1949, Serial No. 106,907

2 Claims. (Cl. 244—15)

The present invention relates to structures for conveying a fluid at high temperature and in particular a structure the outer wall of which is of aerofoil cross section, and constitutes for instance a rotary wing blade propelled by the reaction of said fluid expelled through a nozzle at the tip of said blade.

This application is a division of my co-pending application S. N. 740,327 filed April 9, 1947 which has matured into Patent No. 2,590,457 granted March 25, 1952.

The object of the invention is to provide a device of this kind which is better adapted to meet the requirements of practice than those used up to this time.

According to my invention, such a structure includes an inner wall at least substantially parallel to said outer wall at a small distance therefrom, forming an inner conduit for said fluid and an undulated partition in the interval between said two walls having its ridges running in the longitudinal direction alternately along one and the other of said walls, so as to form a multiplicity of tubular ducts, air or another fluid at a temperature lower than that of said first mentioned fluid being preferably circulated through at least some of said tubular ducts and in particular those a portion of the surface of which is constituted by the inner wall.

According to still another feature of my invention, a structure as just above mentioned is constituted by two half-shells, forming respectively the upper and lower portions of said structure and assembled together along the leading and trailing edges thereof.

Preferred embodiments of my invention will be hereinafter described with reference to the accompanying drawings, given merely by way of example and in which:

Fig. 1 diagrammatically shows, in cross section, an aerodynamic wing blade constituting a structure for conveying a fluid at high temperature according to the invention;

Fig. 2 is a plan view, partly in section, of a rotary wing blade of the kind shown by Fig. 1, shown on a smaller scale;

Figs. 3 to 5 are sectional views of constructional details of a structure according to the invention.

In the following specification, I will describe examples of structures for conveying a fluid at high temperature constituted by aerodynamic elements and in particular rotary wings.

According to my invention, the hot fluid conveying structure includes an inner wall and an outer wall, thus defining an inner conduit and an outer conduit, the hot fluid being intended to flow through the inner conduit. In order to reduce to a minimum the losses of pressure in the inner conduit, this conduit is given a section such that only a small interval is left between the wall of said conduit and the outer wall of the structure (rotary wing or blade in the examples shown). In this interval, I provide a multiplicity of adjoining tubular passages through at least some of which a portion of a relatively cold stream constituted by air under pressure is caused to flow, advantageously with a velocity ensuring a laminar flow, whereas the hot gases, preferably coming from a combustion chamber and having already expanded in a gas turbine, flow through the inner conduit together with a portion of said stream of air under pressure mixed with said gases.

For instance, the cross-section of this inner conduit 101 is given a shape similar to that of the outer wall of the blade, so as to leave, between the outer surface of conduit 101 and the inner surface of blade an interval 103 of small thickness in which I provide an intermediate undulated partition 104 which thus forms in this interval a multiplicity of adjoining tubular ducts each of small section. The tubular ducts 105 that have their bases along the outer wall 102 of the blade constitute the "outer" ducts, whereas the ducts, designated by 106, that have their bases along the wall of conduit 101 constitute the "inner" ducts.

One may cause a portion of the compressed air stream to flow through both ducts 105 and 106, but preferably this portion of the air stream flows merely through the inner ducts 106.

In both cases, the volume and therefore the velocity of the air stream flowing through these ducts is chosen to maintain a laminar flow.

In the embodiment shown by Figs. 1 and 2, the relatively cold stream of air under pressure is caused to flow through the inner ducts 106 which are fed, preferably, from a chamber 107 located close to the inner end of the blade (Fig. 2) and to which air under pressure is delivered through a conduit 108.

In order to determine the amount of air entering each of ducts 106, I provide, between chamber 107 and each of these conduits, a partition provided with a calibrated orifice 109. Ducts 106 open at their outer ends into chamber 110, located ahead of reaction nozzle 111 and into which the hot mixture of gas and air that has flown through the inner conduit 101 is also fed.

Concerning said inner conduit 101, which is fed through a conduit $m$, it is preferably made of several longitudinal sections slidable with respect to one another to permit longitudinal expansion of the whole. Furthermore, preferably, free transverse expansion of the wall of said conduit 101 is permitted by relative sliding of two lips $i$ and $j$ provided on said wall over its whole length (Fig. 1).

When the outer ducts are not fed with air under pressure not used in the manner hereinafter explained, they may be closed at both ends or placed in communication with the surrounding atmosphere.

According to another feature of the invention, the outer ducts 105 are placed in communication, on the one hand, through apertures 112, with the outer side of the wing and on the other hand with a space at a pressure either higher or lower than atmospheric pressure, so as thus to exert on the friction boundary layer on the outer side of wall 102, a blowing or a suction effect. This effect considerably reduces the drag of the wing.

The inside of ducts 105 may be connected, through calibrated tubes 113, with a common chamber 114 which is itself in communication with blowing or sucking means, through a conduit 115 (as shown in solid lines in Fig. 2). Eventually suitably loaded valves may be provided on said tubes 113.

According to another feature of my invention, the pressure conditions in ducts 105 for sucking in, through apertures 112, the boundary layer on the outer surface of wall 102, are obtained through the suction exerted by the gases issuing from nozzle 111 in an annular chamber 116 which surrounds said nozzle and which communicates, through calibrated orifices 117, with ducts 105 (as shown in dotted lines in Fig. 2).

In this case, of course, tubes 113 and chamber 114 are not used.

In all cases, a good heat insulation between the inner conduit 101 and the outer wall 102 is obtained, owing to the provision of ducts 105 and 106 in the interval between said conduit and said wall.

This heat insulation is practically unaffected by the thermal conductivity of the undulated partition 104 which serves to constitute these ducts, even if this undulated wall is metallic.

However, in order further to reduce the effect of this conductivity, this undulated partition may be made of a material which is a bad conductor of heat or a layer of an insulating material may be interposed between the wall of conduit 101 and the undulated partition.

Although it is not necessary to ensure fluid-tightness between ducts 106 and inner conduit 101 since the gases flowing therethrough are substantially at the same pressure, I may, in order to improve the resistance of the structure, stiffen the assembly of outer wall 102 and undulated wall 104 by securing the latter, for instance by welding, on the one hand to the outer wall and, on the other hand, to an inner metal sheet 118, as shown by Fig. 3. Elements 102 and 104 may be assembled together by electrical spot welding. Concerning the welding of elements 104 and 118 together, it may be facilitated by dividing metal sheet 118 into separate sections such as $118_1$, $118_2$, etc. (Fig. 4). Each of the edges $a$ of the sections of this metal sheet may be bent (edges shown in dotted lines by Fig. 4) for making first the longitudinal welds $b$ between partition 104 and the metal sheet sections $118_1$, $118_2$, etc., and finishing the assembly by welding of the bent edges together, as shown at $a_1$ in solid lines.

Furthermore, it is advantageous to constitute the wing structure by assembly of two box-like half-shells $c$ and $d$, forming respectively the upper side and the under side of the wing and these elements being assembled together for instance by external welding along their leading edges (see the assembly shown by Fig. 4) and their trailing edges (see the assembly shown by Fig. 5).

Finally, the profile is completed, concerning the leading edge for instance, by addition of solder $e$ and, concerning the trailing edge, by assembly to the main body of the wing of a trailing edge portion $f$, this assembly being for instance obtained in any suitable manner such as welding or riveting or preferably, as shown by Fig. 5, by means of longitudinal rods $g$ and $h$ engaged in hinges formed alternately in the rear edge of the main body $c$—$d$ of the wing and in the rear end portion $f$.

Inside a wing element thus constituted, one may dispose a freely expansible conduit 1, either insulated as above indicated or not, or, if the gases are at a temperature which is not too high, use merely wall 118 as wall of conduit 101, while accepting a certain expansion of the structural elements thereof which may, within certain limits, be absorbed by deformation of undulated wall 104 and bellows $a_1$.

Of course, it is not necessary to have air or gas in movement flowing through the ducts formed by the undulated partition between the inner conduit and the external wall. On the other hand, at least some of the above described features could be applied to a fixed wing or a wing operated with a reciprocating motion and even, more generally, to any fixed or movable conduit for conveying fluids at high temperature.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An aircraft structure which comprises, in combination, a hollow wing having a skin of airfoil cross section, a continuous wall inside said wing substantially parallel to said skin running along most of the wing span to form a continuous central conduit stopping short of the wing tip where said skin forms a hollow chamber, a jet nozzle at the tip of the wing opening from said chamber into the atmosphere, a corrugated partition in the space between said wall and said skin having its corrugations directed spanwise and alternately applied against said skin and said wall to form, between said wall and said skin over the whole periphery of their cross sections, a layer of fluidtight tubular ducts running spanwise and opening into said chamber at the tip of the wing, means for feeding a stream of hot gas to the root end of said central conduit, and means for feeding a stream of relatively cool gas to the root end of at least every second tubular duct.

2. An aircraft structure which comprises, in combination, a hollow wing having a skin of airfoil cross section, a continuous wall inside said wing substantially parallel to said skin running along most of the wing span to form a continuous central conduit stopping short of the wing tip where said skin forms a hollow chamber, a jet nozzle at the tip of the wing opening from said chamber into the atmosphere, a corrugated partition in the space between said wall and said skin having its corrugations directed spanwise and alternately applied against said skin and said wall to form, between said wall and said skin over the whole periphery of their cross sections, a layer of fluidtight tubular ducts running spanwise and opening into said chamber at the tip of the wing, means for feeding a stream of hot gas to the root end of said central conduit, and means for feeding a stream of relatively cool gas to the root end of every tubular duct a portion of the wall of which is constituted by a portion of said inner wall.

ROBERT POUIT.

References Cited in the file of this patent

UNITED STATES PATENTS

| Number | Name | Date |
|---|---|---|
| 369,169 | Dewey | Aug. 30, 1887 |
| 1,842,736 | Stout | Jan. 26, 1932 |
| 1,890,820 | Markey | Dec. 13, 1932 |
| 2,187,446 | Busselmeier | Jan. 16, 1940 |
| 2,241,972 | Wagner | May 13, 1941 |
| 2,403,569 | Watter | July 9, 1946 |
| 2,410,609 | Pecker | Nov. 5, 1946 |
| 2,469,480 | Sikorsky | May 10, 1949 |
| 2,516,489 | Stalker | July 25, 1950 |
| 2,556,736 | Palmatier | June 12, 1951 |

FOREIGN PATENTS

| Number | Country | Date |
|---|---|---|
| 519,061 | Great Britain | Mar. 15, 1940 |